(12) United States Patent  
Geagan, III et al.

(10) Patent No.: US 8,396,896 B2
(45) Date of Patent: Mar. 12, 2013

(54) ASSIGNING RESOURCES TO A BINARY TREE STRUCTURE

(75) Inventors: John Bernard Geagan, III, San Jose, CA (US); Dulce B. Ponceleon, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 12/943,785

(22) Filed: Nov. 10, 2010

(65) Prior Publication Data

US 2012/0117123 A1 May 10, 2012

(51) Int. Cl.
*G06F 7/00* (2006.01)
*G06F 17/30* (2006.01)
(52) U.S. Cl. ....................................................... 707/797
(58) Field of Classification Search ................... 713/171; 380/242, 277; 370/256; 707/797
See application file for complete search history.

(56) References Cited

U.S. PATENT DOCUMENTS

| | | | |
|---|---|---|---|
| 7,010,125 B2 * | 3/2006 | Lotspiech et al. | 380/242 |
| 7,039,803 B2 | 5/2006 | Lotspiech et al. | |
| 7,296,159 B2 * | 11/2007 | Zhang et al. | 713/171 |
| 7,340,054 B2 | 3/2008 | Asano | |
| 7,370,055 B1 * | 5/2008 | Pande | 707/692 |
| 7,450,722 B2 | 11/2008 | Medvinsky | |
| 7,774,598 B2 | 8/2010 | Chmora et al. | |
| 2006/0101267 A1 * | 5/2006 | Takamura et al. | 713/171 |
| 2006/0282666 A1 | 12/2006 | Kim | |
| 2007/0067622 A1 | 3/2007 | Nakano et al. | |
| 2007/0291948 A1 * | 12/2007 | Jung et al. | 380/277 |
| 2008/0101261 A1 * | 5/2008 | Gorokhov et al. | 370/256 |
| 2008/0101611 A1 | 5/2008 | Lindholm et al. | |
| 2008/0199007 A1 * | 8/2008 | Candelore | 380/201 |

OTHER PUBLICATIONS

Dalit Naor et al., "Revocation and Tracing Schemes for Stateless Receivers", Proceedings of CRYPTO 2001, LNCS 2139, pp. 41-62.
Jeff Lotspiech et al., "Subset-Difference based Key Management for Secure Multicast", Internet Research Task Force SMUG Internet Draft. Jul. 2001. Available on the web at: hrrp://tools.ietf.org/html/draft-irtf-smug-subsetdifference-00. 12 Pages.
"Understanding AACS (Including Subset-Difference)", posted to the web Feb. 17, 2007. Available on the web at: http://forum.doom9.org/showthread.php?t=122363. 12 Pages.

(Continued)

*Primary Examiner* — Sathyanarayan Pannala
(74) *Attorney, Agent, or Firm* — Cantor Colburn LLP; Khanh Tran

(57) ABSTRACT

Embodiments of this disclosure relate to binary tree structures, and more specifically to assigning resources to a binary tree structure, such as for content protection. In embodiments, a total number of resources in a first category of resources is identified. The resources may be devices that play encryption protected content such as a CD, a DVD, an HD DVD, a BD, and a Secure Digital card, for example. In embodiments, a minimum number of dummy resources are assigned to a corresponding number of leaf nodes of the binary tree structure before resources in the first category of resources are assigned to leaf nodes in the binary tree structure. Generally, the minimum number of dummy resources is greater than or equal to 1+floor(2^floor(log2(N)−1)), wherein N is greater than or equal to the total number of resources in the first category of resources.

25 Claims, 13 Drawing Sheets

OTHER PUBLICATIONS

Kevin Henry et al., "An Overview of the Advanced Access Content System (AACS)", CACR: Technical Reports 2007, Report No. 25, CACR 2007-25, 24 pages. Report Listing is available on the web at: http://www.cacr.math.uwaterloo.ca/techreports/2007/tech_reports2007.html Report No. 25 is available on the web at: http://www.cacr.math.uwaterloo.ca/techreports/2007/cacr2007-25.pdf.

Weifeng Chen et al., "On Dynamic Subset Difference Revocation Scheme", Networking 2004, LNCS 3042, IFIP International Federation for Information Processing 2004, pp. 743-758.

Advanced Access Content System (AACS), Introduction and Common Cryptographic Elements Book, Revision 0.951, Final, Chapters 1 and 3, Sep. 28, 2009.

\* cited by examiner

| Number of resources in category | Number of dummy resources |
|---|---|
| 1 | 1 |
| 2 | 2 |
| 3 | 2 |
| 4 | 3 |
| 5 | 3 |
| 6 | 3 |
| 7 | 3 |
| 8 | 5 |
| ... | ... |
| 15 | 5 |
| 16 | 9 |
| ... | ... |
| 31 | 9 |
| 32 | 17 |
| ... | ... |
| 63 | 17 |
| ... | ... |
| N | 1 + floor(2^floor(log2(N)-1)) |

Identify a total number of resources in a first category of resources
1310

Assign a minimum number of dummy resources to a corresponding number of leaf nodes of a binary tree structure, wherein the minimum number of dummy resources is greater than or equal to 1 + floor(2^floor(log2(N)-1)), wherein N is greater than or equal to the total number of resources in the first category of resources
1320 determining a maximum total number of resources in any category of resources having resources to be assigned to leaf nodes of the binary tree structure; and
1332 setting the minimum number of dummy resources to be 1 + floor(2^floor(log2(N)-1)), wherein N is the maximum total number
1334

1330 dynamically assigning, based on the total number of resources, a minimum number of dummy resources to a corresponding number of leaf nodes of a binary tree structure, wherein the minimum number of dummy resources is greater than or equal to 1 + floor(2^floor(log2(N)-1)), wherein N is greater than or equal to the total number of resources in the first category of resources

1340

Assign each resource in the first category of resources to a leaf node in the binary tree structure
1350

ASSIGNING RESOURCES TO A BINARY TREE STRUCTURE

FIELD

Embodiments of the disclosure relate to binary tree structures, and more specifically to assigning resources to a binary tree structure, such as for content protection.

BACKGROUND

A binary tree structure (sometimes referred to simply as a binary tree) is a non-linear data structure in which each node has at most two child nodes. A parent node is a node with at least one child. A leaf node is a node without any children. A full binary tree is a tree in which every node has two children, except the leaf nodes.

Binary trees have many applications. For example, binary trees may be used in language parsing, such as by applying a binary expression tree. Some compilers use a binary expression tree to represent an arithmetic expression, for example, with the nodes of the binary expression tree being binary operators and operands. Binary trees are also used in cryptography. For example, a Merkle tree, as known as a hash tree, is a complete binary tree. A complete binary tree is a binary tree in which every level, except possibly the last level, is completely filled. Currently, Merkle trees are used in peer-to-peer networks to check that data blocks received from other peers in the network are received undamaged and unaltered.

Binary trees are also used in broadcast encryption. The area of broadcast encryption was first formally studied by Fiat and Naor in 1994. In 2001, Naor et al. published a paper entitled "Revocation and Tracing Schemes for Stateless Receivers." The paper discussed broadcast encryption in a stateless receiver scenario. A stateless receiver is a receiver that is not capable of recording, or cannot be relied upon to record, a past history of transmissions and change its state accordingly. This scenario is particularly applicable to receivers that are not constantly on-line, such as media players, e.g., a CD or DVD player where the "transmission" is the current disc. In the paper, Naor et al. described a broadcast encryption scheme using binary trees and a subset difference method.

BRIEF SUMMARY

Embodiments of this disclosure provide a method for assigning resources to leaf nodes of a binary tree structure such that, for a subset difference list for the binary tree structure, each subset difference item of the subset difference list covers resources from only one category of resources, the method including identifying a total number of resources in a first category of resources; assigning a minimum number of dummy resources to a corresponding number of leaf nodes of a binary tree structure, wherein the minimum number of dummy resources is greater than or equal to $1+\text{floor}(2^{\text{floor}(\log_2(N)-1)})$, wherein N is greater than or equal to the total number of resources in the first category of resources; and subsequently assigning each resource in the first category of resources to a leaf node in the binary tree structure. Assigning the minimum number of dummy resources may include determining a maximum total number of resources in any category of resources having resources to be assigned to leaf nodes of the binary tree structure; and setting the minimum number of dummy resources to be $1+\text{floor}(2^{\text{floor}(\log_2(N)-1)})$, wherein N is the maximum total number. Assigning the minimum number of dummy resources may include dynamically assigning, based on the total number of resources. Dynamic assigning may include accessing a stored total number of resources of a different category of resources, wherein the resources of the different category were previously assigned to other leaf nodes of the binary tree structure; and selecting to be N the greater of the stored total number of resources of the different category of resources and the total number of resources in the first category of resources. Dynamic assigning may include assigning a predetermined default number of dummy resources to a corresponding number of leaf nodes of the binary tree structure; determining if the predetermined default number of dummy resources is less than $1+\text{floor}(2^{\text{floor}(\log_2(N)-1)})$ when N is equal to the total number of resources in the first category of resources; and assigning an additional number of dummy resources to a corresponding number of leaf nodes of the binary tree structure if the predetermined default number of dummy resources is less.

Embodiment of this disclosure also provide a system for assigning resources to keys, the system including keys represented by a binary tree structure; a storage storing information relating to resources divided into a plurality of categories based on one or more similar properties; and an assignment mechanism coupled to the binary tree structure and the storage. The assignment mechanism may include an identifier coupled to the storage, the identifier identifying a total number of resources in a first category of resources; a padder coupled to the binary tree structure and the identifier, the padder to receive from the identifier the total number of resources in the first category of resources and to assign a minimum number of dummy resources to a corresponding number of leaf nodes of the binary tree structure, wherein the minimum number of dummy resources is greater than or equal to $1+\text{floor}(2^{\text{floor}(\log_2(N)-1)})$, wherein N is greater than or equal to the total number of resources in the first category of resources; and a key assigner coupled to the binary tree structure and the storage, the key assigner to assign each resource in the first category of resources to a leaf node in the binary tree structure. The resources may be players of encryption protected content. The one or more properties may be selected from the group consisting of manufacturer, brand, originating location, and destination location.

Embodiments of this disclosure further provide a method for assigning media players to content decryption keys, the method including identifying a binary tree having leaf nodes representing content decryption keys; identifying a total number of media players in a current category of media players; accessing a stored total number of media players of a previous category of media players, wherein the media players of the previous category were previously assigned to leaf nodes of the binary tree; selecting a number N to be the greater of the total number of media players in the current category of media players and the stored total number of media players of the previous category of media players; using the selected number N, determining a value of $1+\text{floor}(2^{\text{floor}(\log_2(N)-1)})$; assigning a minimum number of dummy resources to a corresponding number of leaf nodes of the binary tree, wherein the minimum number is the determined value; and assigning each media players in the current category of resources to a leaf node in the binary tree. The method may include deactivating the keys corresponding to leaf nodes assigned to the dummy resources.

BRIEF DESCRIPTION OF THE DRAWINGS

Embodiments of the invention are described by way of example with reference to the accompanying drawings wherein

FIG. 13 is a flow chart showing a method in accordance with embodiments of this disclosure;

Figure 1:
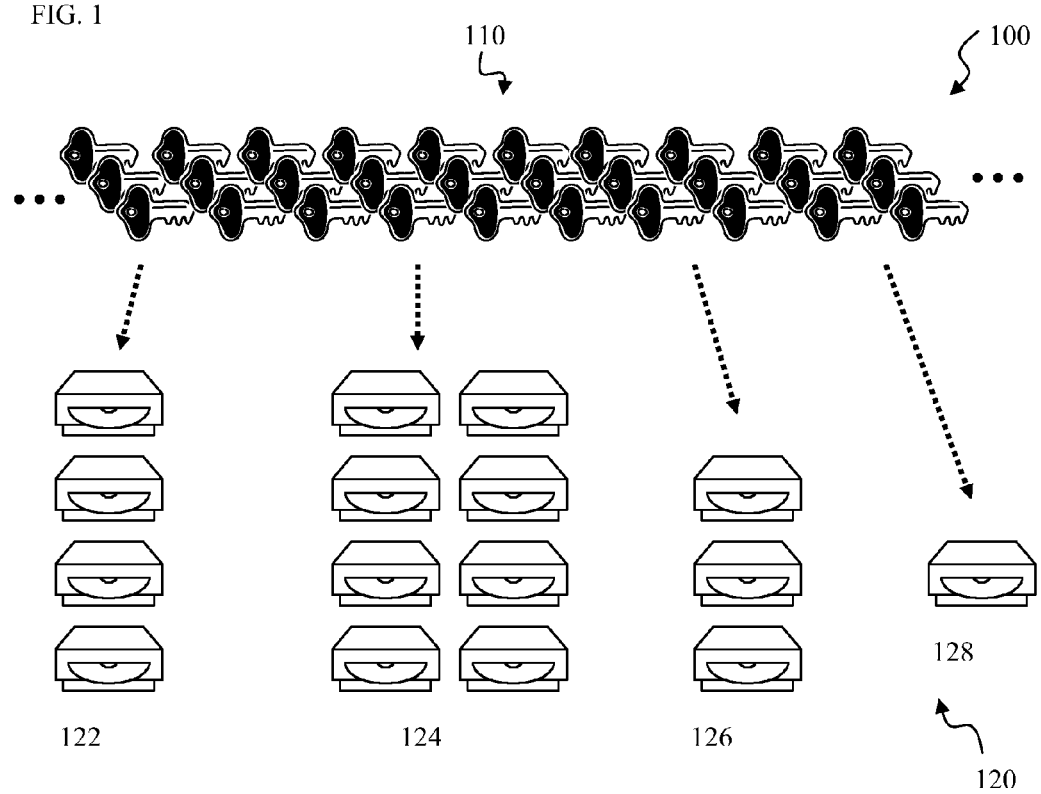
FIG. 1 is a representation of exemplary resources and keys in accordance with embodiments of this invention.

It is noted that the drawings of the disclosure are not to scale. The drawings are intended to depict only typical aspects of the disclosure, and therefore should not be considered as limiting the scope of the disclosure. In the drawings, like-numbering represents like-elements when comparing between drawings.

DETAILED DESCRIPTION

Introduction

Embodiments of the disclosure relate to binary tree structures, and more specifically to assigning resources to a binary tree structure, such as for content protection. There is an increasing desire to distribute content to a large group of potential users, yet permit only a limited subset of those users (e.g., compliant devices, paid members, etc.) to be able to use and/or access the content. This subset may be dynamic (e.g., changing with the introduction of new devices, loss of devices, addition or expiration of subscriptions, etc.). In certain applications, it may also be preferable to provide this access without two-way authentication communications.

Content protection systems use technological tools to restrict the use of and/or access to content, which are often works of authorship. Broadcast encryption deals with methods of broadcasting encrypted information to a large group of devices in a manner such that only a privileged subset of those devices can decrypt the encrypted information. Broadcast encryption is currently being used for content protection of recordable and prerecorded media. It may be implemented in consumer electronics devices, from audio players that use Secure Digital cards to CD, DVD, HD, DVD, and/or BD players to set-top boxes, for example. Embodiments of this invention may be implemented in such devices. Embodiments of this invention may also be implemented in other devices that employ content protection tools, e.g., electronic book readers, electronic readers of subscription-based content such as electronic magazines/journals, and/or readers of sensitive content such as financial records, medical records, or classified or confidential documents. The content itself may be stored in commodity articles, such as CDs or Secure Digital cards, which may be made generally available in the marketplace through traditional distribution channels, or it may be broadcasted, such as over communication lines or over the air from a satellite dish, radio tower, Wi-Fi tower, wireless router, or cellular phone network tower.

In this disclosure, a content protection system uses one or more binary trees as part of its content protection mechanism. For example, encrypted content, e.g., shows of a particular television channel, may be protected using a method in which keys for decrypting the content are represented by a binary tree structure. Devices that can play the content, e.g., a compliant set-top box, may then be assigned to leaf nodes of the binary tree, and thereby assigned a key that it can use to decrypt the content. In a preferred embodiment, this decryption is done without additional authentication communications between the set-top box and the broadcasting company. To deactivate a key (e.g., because a user's subscription has expired), new content may be broadcasted along with a subset-difference list that identifies the coverage of active keys, as explained in further detail below. Embodiments of this disclosure provide a method for assigning resources (e.g., set-top boxes) to leaf nodes of a binary tree structure such that, for a subset difference list for the binary tree structure, each subset difference item of the subset difference list covers resources from only one category of resources. This may be particularly useful in subsequent forensics, for example.

FIG. 1 is a representation of exemplary resources and keys in accordance with embodiments of this invention. FIG. 1 shows a system 100 that includes keys 110 and resources 120. The resources use, store, and/or access protected content, such as copy protected content. The resources may be, for example, set-top boxes, electronic readers, CD players, DVD players, HD DVD players, BD players, and/or Secure Digital card readers. In certain embodiments, the resources are rooms, floors of a building, and/or documents that store protected content. For example, a resource may be a medical record in which certain content, such as content in particular fields, are encrypted such that only certain devices can display that content.

The resources 120 are grouped into categories, e.g., 122, 124, 126, and 128. The categories are based on one or more properties such as manufacturer, brand, originating location, and destination location. The originating location may be, for example, an originating geographical location (e.g., a particular warehouse or state), or an originating broadcasting location (e.g., a sports stadium). In FIG. 1, resources in category 122 are media players made by one company, 124 are media players made by a second, different company, etc. As seen in FIG. 1, a first category (e.g., 122) may include a different number of resources than a second category (e.g., 124). The keys 110 are to be assigned to the resources 120. Embodiments of this invention assign resources (e.g., 120) to keys (e.g., 110) by using a binary tree structure to represent the keys, and assigning resources to leaf nodes of the binary tree structure such that, for a subset difference list for the binary tree structure, each subset difference item of the subset difference list covers resources from only one category of resources.

Subset Difference

Figure 2:
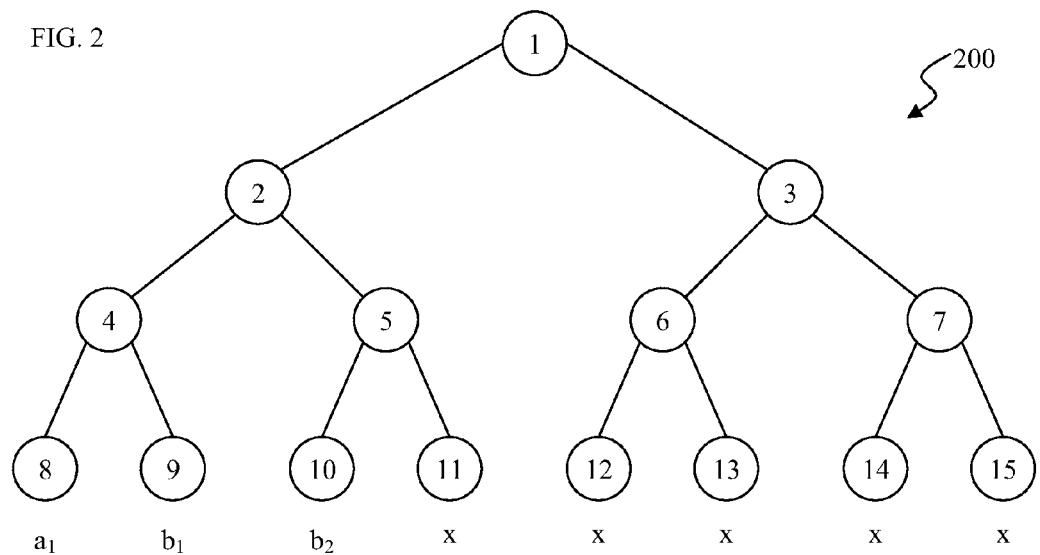
FIG. 2-8 are illustrations of various binary trees.

A subset difference is a set made by excluding a set (represented by a smaller tree structure) from a larger set (represented by a larger tree structure which includes the smaller tree structure). The subset difference is determined by specifying two nodes, namely a first node for the larger tree structure and a second node for the smaller tree structure. FIG. 2 is an illustration of a binary tree 200. In FIG. 2, three categories of resources are depicted: a, b, and x. Resources a and b may be, for example, media players from 122 and 124, respectively. Resources a and b may also be, as another example, a set-top box from a first manufacturer A and set-top boxes from a second manufacturer B, respectively. In FIG. 2, x represents a dummy resource. As used herein, a dummy resource is a default resource to which a key may be assigned. In certain uses, this may be, for example, a resource owned by the source of the keys themselves, such as a standards organization. This allows a key to be assigned to a controlled resource, and in some applications, prevents the key from entering into the stream of commerce.

For the binary tree shown in FIG. 2, a subset-difference list that identifies coverage for the keys assigned to actual resources, represented by nodes 8, 9, and 10, may be expressed as "2-11". This expression means "all the leaf nodes under node 2, but not under node 11". Accordingly, two nodes are specified, a first node for the larger tree structure (node 2) and a second node for the smaller tree structure (node 11) that is excluded from coverage.

This subset-difference ("S-D" or "SD") expression may also be equivalently expressed in other forms. For example, a subset difference list with an equivalent meaning, but having two items rather than one item, could be "2-5 plus 5-11". The "2-5" SD item covers the $a_1$ resource and the $b_1$ resource, while the "5-11" covers the $b_2$ resource. As used herein, an optimal SD list is the smallest SD list that covers all of the nodes to be covered exactly once. Such an optimal SD list minimizes the amount of information that, for example, is stored or transmitted along with the protected content, e.g., along with the encrypted movie in a DVD or along with the encrypted television show in a header file. In FIG. 2, the optimal SD list for the binary tree 200 is "2-11".

As understood with reference to FIG. 2, the optimal SD list "2-11" mixes resources of different categories. "2-11" includes a resource from the a resource category and also from the b resource category. However, for various reasons, it may be preferable to be able to create an SD list where each item within the SD list covers only resources from the same category. For example, in the set-top box example above, having the ability to create a subset difference list, where each subset difference item of the subset difference list covers resources from only one manufacturer, makes it easier in certain applications to determine which set-top box decrypted a show and has now posted that show online in an unauthorized manner.

Figure 3:
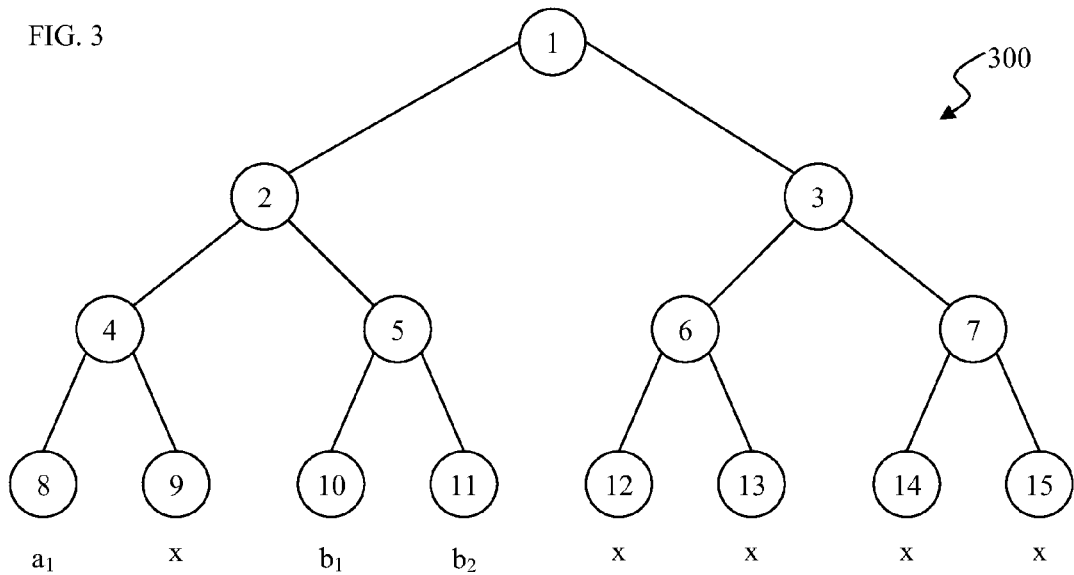

In FIG. 2, all resources are assigned to leaf nodes without interruption from left to right on the binary tree 200, creating the mixing described above, or a potential for such mixing. FIG. 3 is an illustration of a binary tree 300. In the binary tree 300, rather than assigning resources to leaf nodes consecutively from left to right, an x resource is assigned after the assignment of the a resource. For this binary tree, the optimal SD list is "2-9" which means all the leaf nodes under node 2, but not under node 9. However, this SD list still includes both a resources and b resources.

Figure 4:
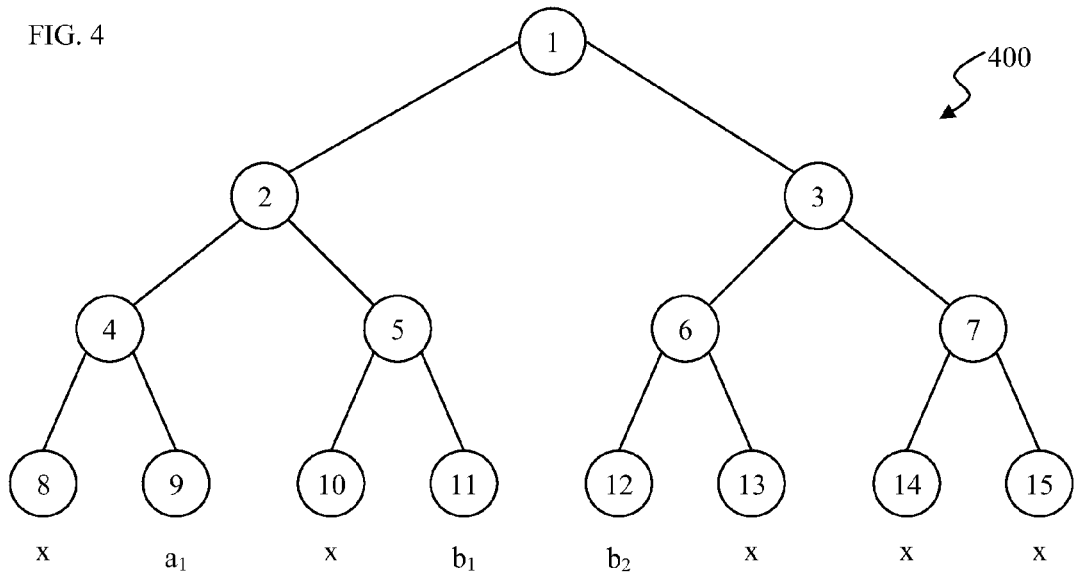

FIG. 4 is an illustration of a binary tree 400. In the binary tree 400, in addition to assigning an x resource between the assignment of the a resource and the assigning of a b resource, an x resource is also assigned before the a resource is assigned. For the binary tree 400, the optimal SD list is "4-8 plus 5-10 plus 6-13". For this optimal SD list, none of the SD items covers resources from different categories. "4-8" covers only a resources; "5-10" covers only b resources, and "6-13" covers only b resources. As can be understood from considering together the binary tree 300 and 400, when the relative spacing between the a category resources and b category resources are the same relative to each other, SD lists may or may not include elements from both categories depending on the position in the tree.

Figure 5:
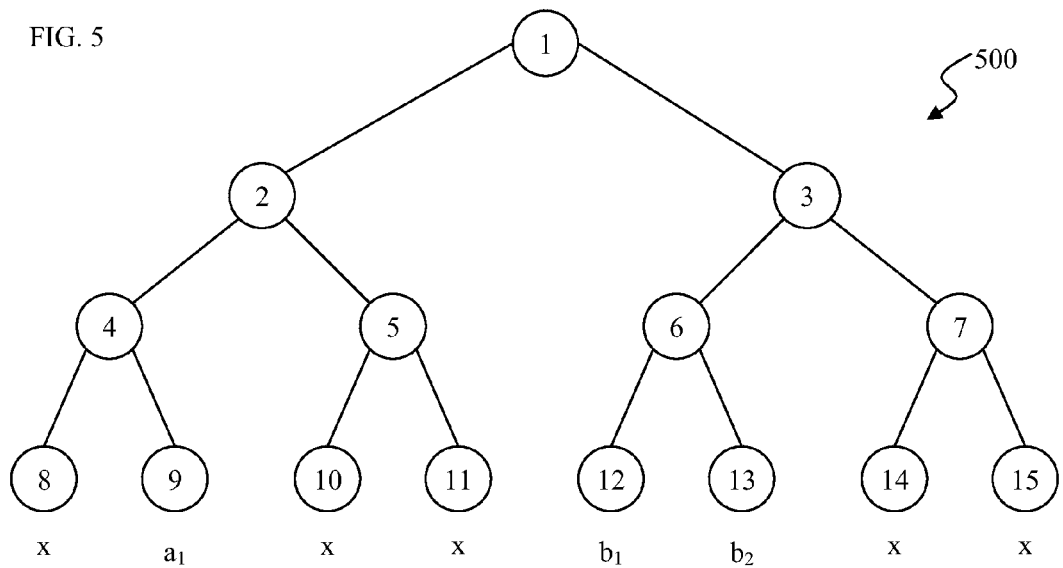

FIG. 5 is an illustration of a binary tree 500. In the binary tree 500, an additional x resource is assigned between the a resource and the b resources. For the binary tree 500, the optimal SD list is "4-8 plus 3-7". Each SD item in this optimal SD list also cover resources from only one category: "4-8" covers again only a resources and "3-7" covers only b resources. This optimal SD list is smaller than the optimal SD list for the binary tree 400.

Figure 6:
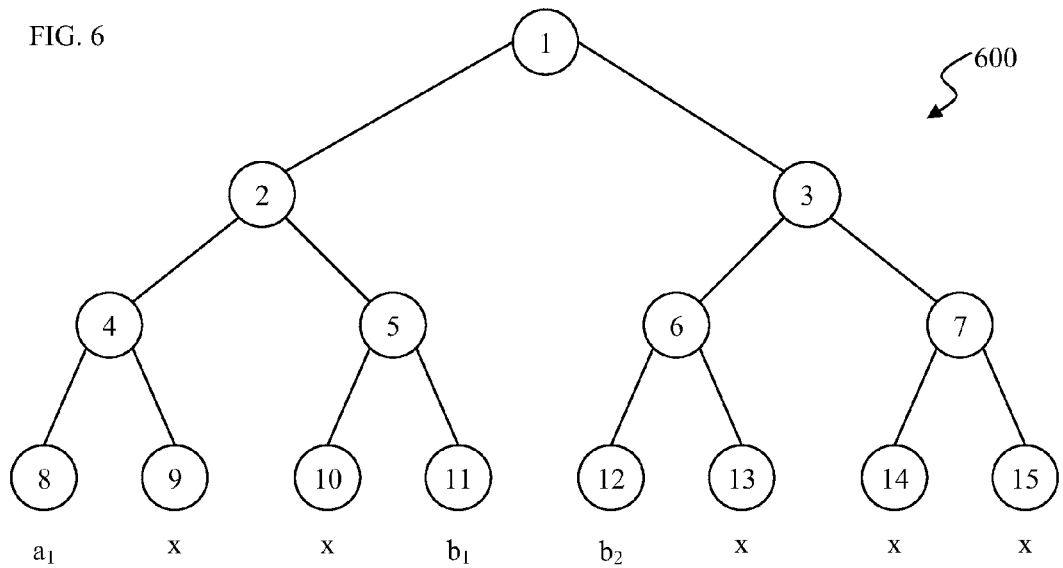

FIG. 6 is an illustration of a binary tree 600. In the binary tree 600, no x resource is assigned before the a resource. The optimal SD list for the binary tree 600 is "4-9 plus 5-10 plus 6-13". Each SD item in this optimal SD list also covers resources from only one category: "4-9" covers only the a resource, 5-10 covers only b resources, and 6-13 covers only b resources. This optimal SD list is larger than the optimal SD list for the binary tree 500.

Accordingly, as can be understood from the above descriptions, the optimal SD lists for the binary trees 400, 500, and 600 each have SD items that cover resources from only one category of resources, but would use different amounts of memory, in certain embodiments, to store the optimal SD list and uses different numbers of dummy resources. The optimal SD list for the binary tree 400 is "4-8 plus 5-10 plus 6-13" and uses at least three keys in assigning dummy resources at node 8, node 10, and node 13. The optimal SD list for the binary tree 500 is "4-8 plus 3-7" and uses five keys in assigning dummy resources at node 8, node 10, node 11, node 14, and node 15. The optimal SD list for the binary tree 600 is "4-9 plus 5-10 plus 6-13" and uses at least three keys in assigning dummy resources at node 9, node 10, and node 13.

In certain applications, it is preferable to minimize the size of the optimal SD list, minimize the number of dummy resources assigned, and still having the optimal SD list contain SD items that cover only resources from one category, regardless of where in the tree the assignment of the resources from a category begins. Further, in certain applications, it is preferable for these conditions to be accomplished operationally, such as to minimize modification of legacy systems. For example, in certain applications, it may be preferable to know that so long as assignments of resources are separated by a particular number of dummy resources (which may also be referred to herein as padding), the conditions above will hold true.

Figure 7:
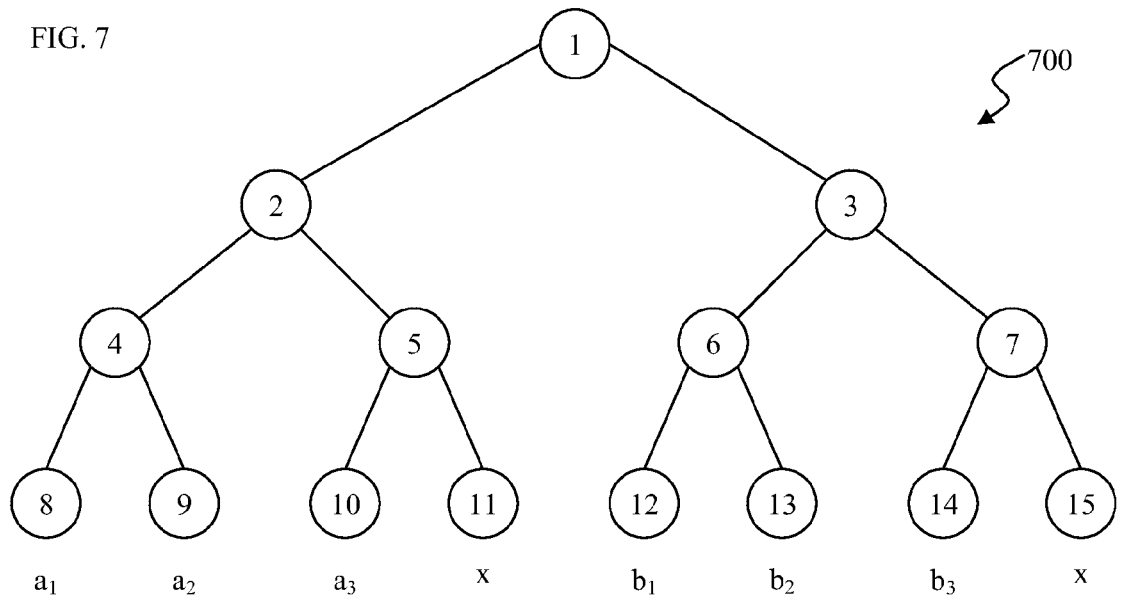

FIG. 7 is an illustration of a binary tree 700. The binary tree 700 is divided into fixed-size groups of a power of two, $2^k$, and the resources are buffered by the selected power of two, $2^k$, minus a number of resources, N. In FIG. 7, for example, k is 2 such that the resources are buffered by $2^k-N=2^2-N=4-N$. Resources $a_1$-$a_3$ are assigned to leaf nodes of the binary tree 700. Since there are three resources in the a resource category, 4-N=4-3=1, so one dummy resource is subsequently assigned to a leaf node (in this example, node 11). Then resources $b_1$-$b_3$ are assigned to leaf nodes of the binary tree 700. Since there are also three resources in the b resource category, 4-N=4-3=1, so one dummy resource is also subsequently assigned to a leaf node (in this example, node 15). When the assignment of resources from a particular category begins on a multiple of $2^k$ boundary, this operational assignment technique minimizes the dummy resource assignments, while having the optimal SD list contain SD items that cover only resources from one category. However, for certain applications that desire greater scalability, this technique may not be preferred. For example, for binary tree 700, categories have no greater than $2^k$ resources. Selecting a larger $2^k$ value (e.g., k=8) has the potential to increase the keys loss to dummy resource assignment. For example, if several categories have a small number of resources (e.g., 1), then several leaf nodes (e.g., 255 leaf nodes) and therefore several keys, will be assigned to dummy resources and not available for assignment to actual devices that will be distributed in the market. Additionally, under this technique, if assignment of resources from a category starts on a leaf node that is not a multiple of $2^k$ from the leftmost node, then for some values of N, an optimal SD list may contain SD items that cover resources from more than one category. This is better understood with reference to FIG. 8.

Figure 8:
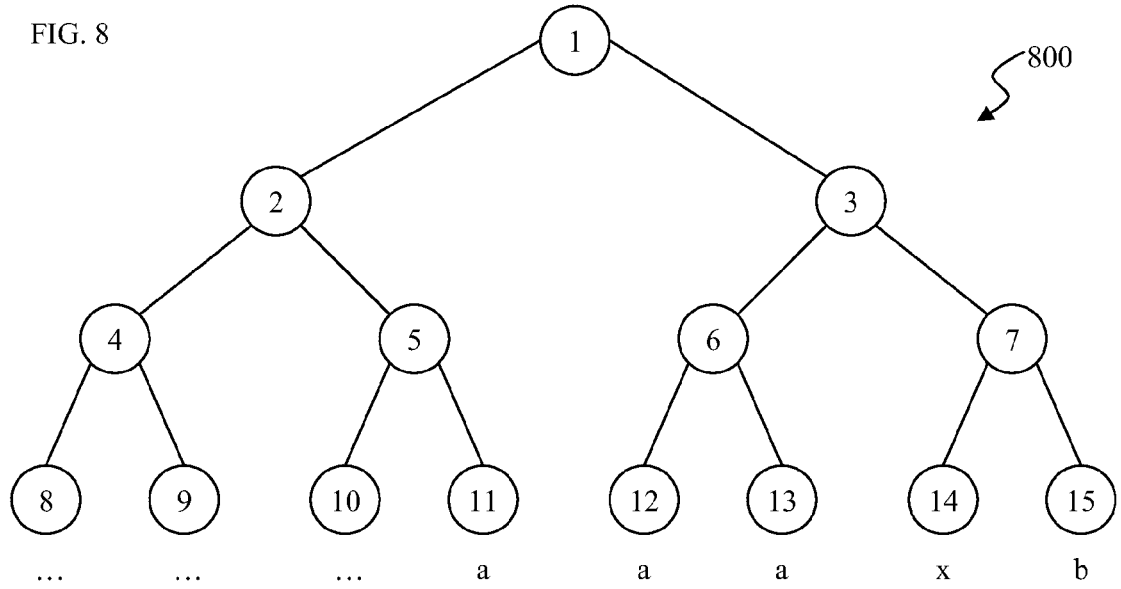

FIG. 8 is an illustration of a binary tree 800. An optimal SD list for the binary tree 800 would include one SD item that is "3-14" (or possibly "1-14" depending on what is assigned before the a resources shown). Such an SD item covers both a resources and b resources. While some applications may have the capability to ensure that assignment of a resource begins on a certain leaf node, other applications may not. For example, encapsulated list objects may not allow access to an underlying key representation.

Exemplary Embodiments

After trial-and-error testing of various techniques to assign resources to keys represented by a binary tree, we discovered a technique for assigning a minimal number of dummy resources between assignments of resources from different categories such that, for an optimal SD list for that tree, each SD item covers resources from only one category. In our experiments, the technique applies to categories of any size and is independent of the position in the binary tree on which assigning resources from a category begins. Initially, we assigned resources that were divided into categories ranging in size from one resource to twenty-one resources. A pattern emerged. We confirmed that the pattern applies when assigning resources from any size category and to any position within a binary tree. Parts of this pattern we express mathematically herein for precision. However, this disclosure does not claim a mathematical expression itself; rather this disclosure claims practical application of a mathematical expression.

Figure 9:
FIG. 9 is a table identifying a minimum amount of dummy resources to be assigned to a binary tree in accordance with embodiments of this invention.

FIG. 9 is a table 900 identifying a minimum amount of dummy resources to be assigned to a binary tree in accordance with embodiments of this invention. The left column of the table 900 identifies a number of resources in a category. The right column of the table identifies a minimum number of dummy resources to be assigned to the binary tree based on the left column value. For ease of explanation, the table is explained with reference to a small number of resources. In use, large number of resources may be more typical.

In one embodiment, the resources are categorized based on manufacturer. For example, manufacturer C may make 3 set-top boxes and manufacturer D may make 7 set-top boxes. In one embodiment, before assigning each of the 3 set-top boxes to keys (via assigning each of the 3 set-top boxes to leaf nodes of a binary tree representing the keys), dummy resources are first assigned. As seen in table 900, for 3 resources, a minimum of 2 dummy resources are to be assigned, and for 7 resources, a minimum of 3 dummy resources are to be assigned. This is illustrated in FIG. 10.

Figure 10:
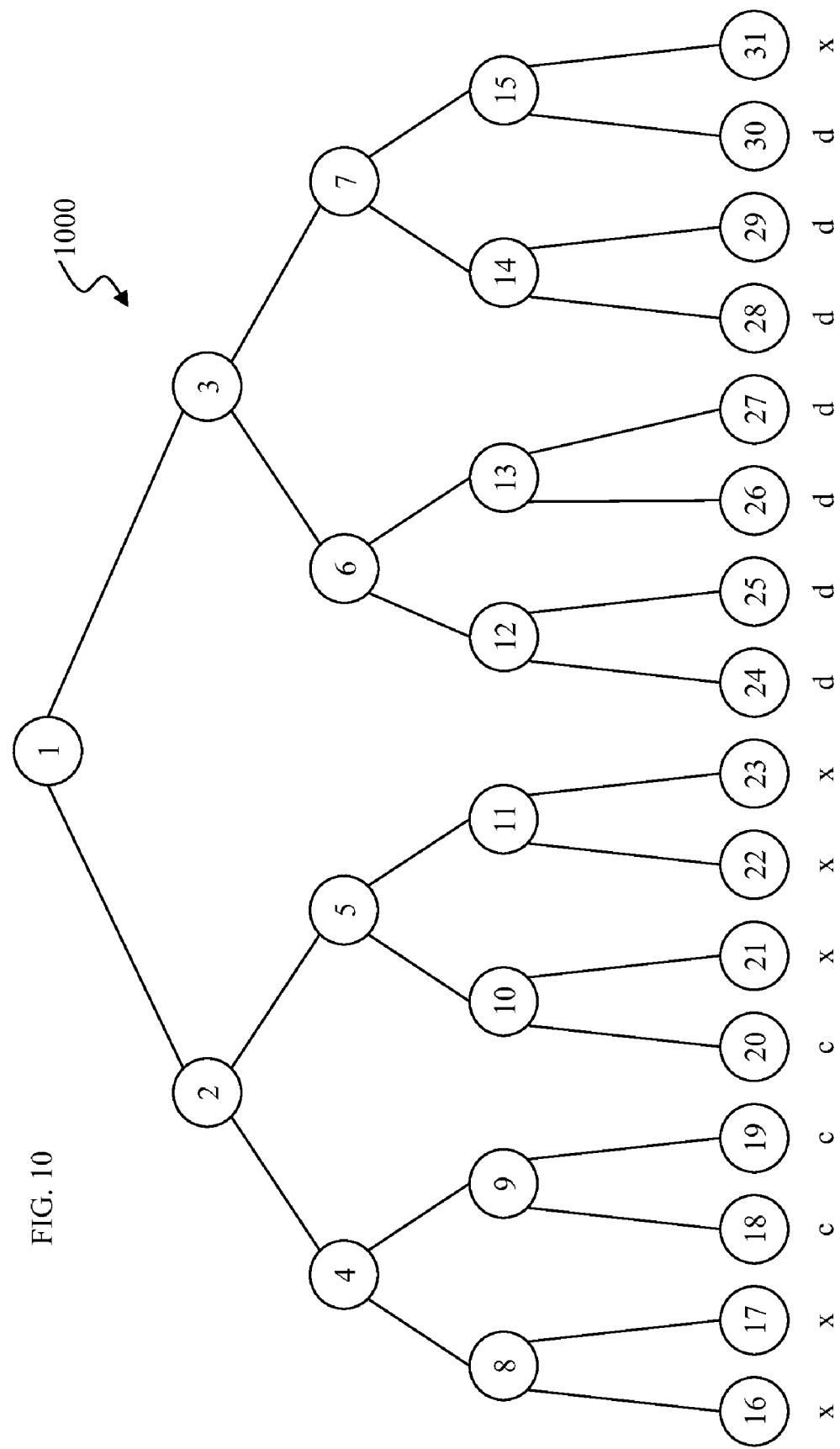
FIG. 10-12 are illustrations of various binary trees in accordance with embodiments of this invention.

FIG. 10 is an illustration of a binary tree 1000 in accordance with embodiments of this invention. In FIG. 10, 2 dummy resources are assigned to leaf nodes (nodes 16 and 17), then the 3 set-top boxes from manufacturer C are assigned to leaf nodes (nodes 18-20), then 3 dummy resources are assigned to leaf nodes (nodes 21-23), then 7 set-top boxes from manufacturer D are assigned to leaf nodes (nodes 24-30). In some embodiments, a dummy resource, x, is assigned to leaf node 31.) The optimal SD list for this binary tree is "4-8 plus 10-21 plus 3-31". Each SD item in this list covers only resources from one category. "4-8" covers only set-top boxes from manufacturer C. "10-21" also covers only set-top boxes from manufacturer C. "3-31" covers only set-top boxes from manufacturer D.

Figure 11A:
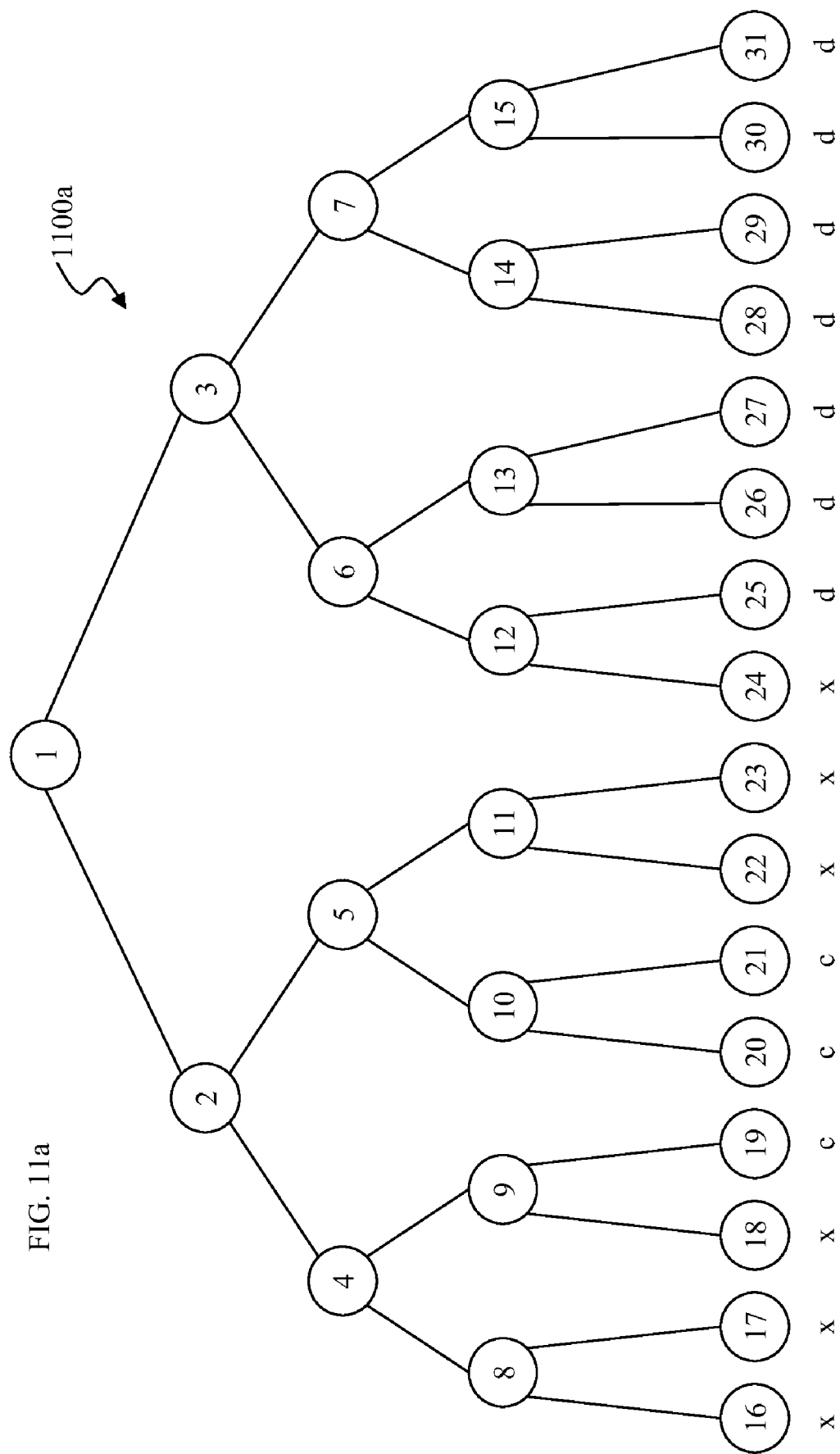

As can be seen from FIG. 11a, this hold true even if additional padding beyond the minimum identified in table 900 are added. FIG. 11a is an illustration of a binary tree 1100a in accordance with embodiments of this invention. In FIG. 11a, a dummy resource is assigned to node 18, such that 3 dummy resources are assigned to leaf nodes (nodes 16, 17, and 18), before the 3 set-top boxes from manufacturer C are assigned to leaf nodes (nodes 19-21). The optimal SD list for this binary tree is "9-18 plus 5-11 plus 3-24". Each SD item in this list also covers only resources from one category. "9-18" covers only set-top boxes from manufacturer C. "5-11" also covers only set-top boxes from manufacturer C. "3-24" covers only set-top boxes from manufacturer D.

Figure 11B:
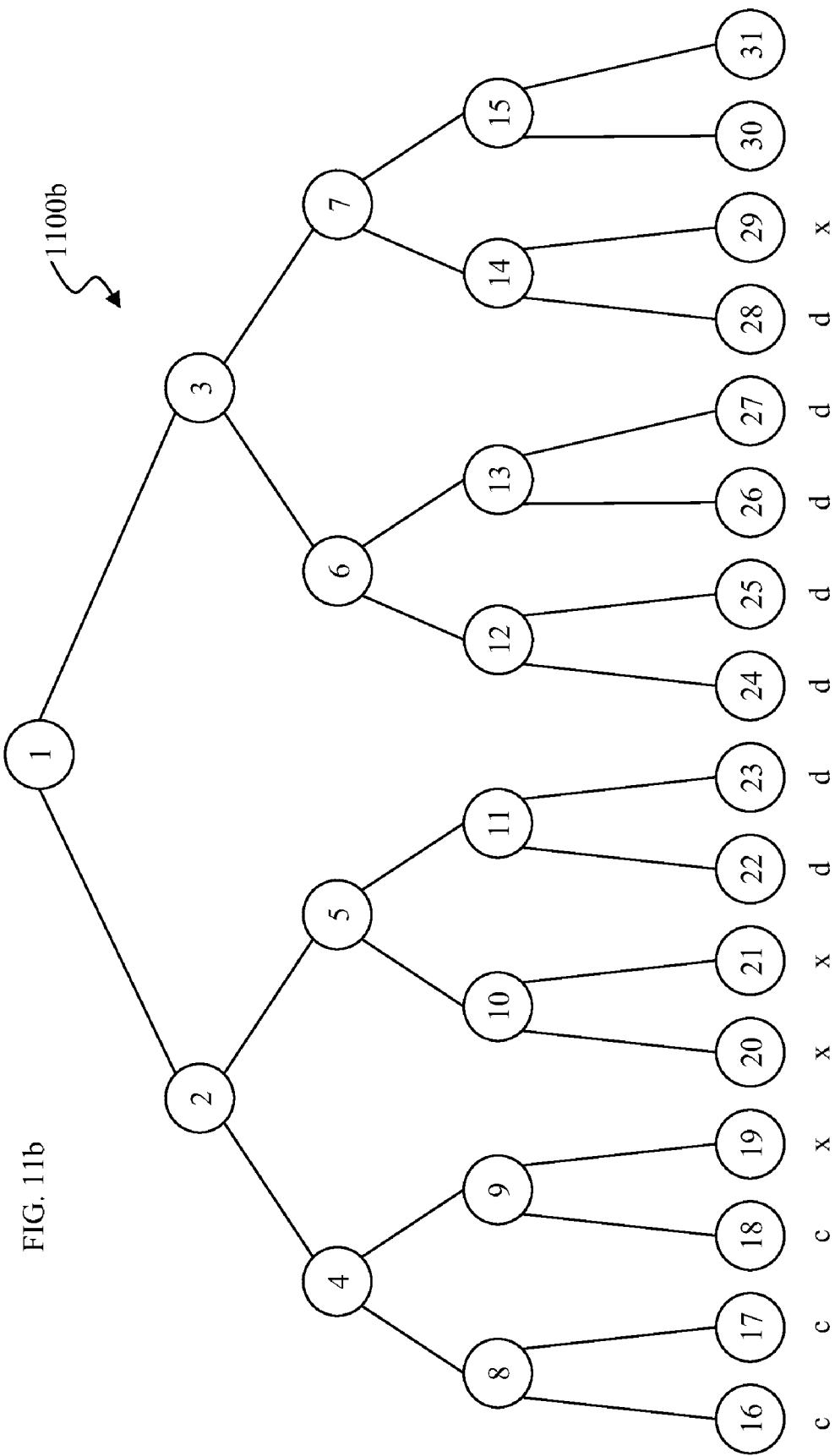

In one embodiment, the system (e.g., via the assignment mechanism 1530 described below with reference to FIG. 15) determines that the 3 set-top boxes from manufacturer C are the first resources to be assigned to leaf nodes in the binary tree. In such embodiments, in response to making such a determination, the system does not assign any dummy resources (i.e., assigns zero dummy resources) before assigning the 3 set-top boxes from manufacturer C. This can be seen in FIG. 11b. FIG. 11b is an illustration of a binary tree 1100b in accordance with embodiments of this invention. In FIG. 11b, no dummy resources are assigned to leaf nodes of the binary tree 1100b before the 3 set-top boxes from manufacturer C are assigned to leaf nodes. Rather, the 3 set-top boxes from manufacturer C are assigned to leaf nodes 16-18. Then 3 dummy resources are assigned to the leaf nodes (nodes 19-21), based on N=7.Then, the 7 set-top boxes from manufacturer D are assigned to leaf nodes (nodes 22-28). The optimal SD list for the binary tree 1100b is "4-19 plus 5-10 plus 3-7 plus 14-29". Each SD item in this list covers only resources from one category. "4-19" covers only set-top boxes from manufacturer C. "5-10", "3-7", and "14-29" each cover only set-top boxes from manufacturer D.

As shown in FIG. 9, a minimum number of dummy resources to be assigned before assigning resources from a given category to leaf nodes of a binary tree in accordance with embodiments of this invention can be expressed as $1+\text{floor}(2^{\text{floor}(\log 2(N)-1)})$. N is greater than or equal to the number of resources in that given category. However, different embodiments may use different processes for selecting the exact value of N to apply. Three exemplary embodiments are described below.

Predetermined Maximum Allowed Resources per Category (Predetermined MARC): In one embodiment, a system sets a maximum total number of resources that each category may have. For example, in one embodiment, the resources are devices that play shows of a television channel. The resources may be categorized based on subscriber. A content protection system may have a limit that any subscriber will be permitted to decrypt and view shows on the channel on up to only five devices (e.g., two televisions, one computer, one mobile phone, and one other hand-held device). Certain subscribers may register only three devices, e.g., for a lower price. Since the system has set a maximum total number of devices per subscriber (and therefore a maximum total number of resources per category in this example), the system may set the minimum number of dummy resources to be $1+\text{floor}(2^{\text{floor}(\log 2(N)-1)})$, wherein N is that maximum total. In this example, since the maximum total is 5, the system would set the minimum number of dummy resources to be 3. Accordingly, in this example, each time a new subscriber is added, the system assigns 3 dummy resources to the binary tree before assigning the actual devices that the subscriber is registering with the system.

While more than an absolute minimum number of keys may be assigned to dummy resources in this embodiment (for example, for the subscriber registering only 3 devices, 1 extra dummy resource is assigned than is identified in table 900 for 3 resources), the number of dummy resources assigned (3 in this example) is not arbitrarily chosen. Rather, that number is based on a particular predefined maximum allowed number of resources per category. Understood from another perspective, in such an embodiment, subsequent to assigning a minimum number of dummy resources for the number of actual resources in a current category and prior to assigning each media player in the current category of resources to a leaf node in the binary tree, the system assigns an additional number of dummy resources to leaf nodes. In this example, the additional number of dummy resource is 1. If the predefined maximum number is changed, e.g., increased to 10, then the system can begin assigning 5 keys, rather than 3 keys, to dummy resources. The optimal SD list for that binary tree will still contain only SD items that cover resources from one category.

In one embodiment, when the subscriber later registers an additional device (e.g., a fourth device in the above example), the system identifies that an extra dummy resource was assigned in association with that category (in this example, with that subscriber). In such an embodiment, the system may assign the additional device to the leaf node that was associated with that extra dummy resource.

In another embodiment, even when the subscriber registers less than five devices, the system (e.g., via the assignment mechanism 1530 described below with reference to FIG. 15) assigns keys as if five devices are being registered. These keys are stored, e.g. in a database. The keys are released to those subscriber's devices which are registered, e.g., the three devices in the example above. If the subscriber decides to later register additional devices, up to the maximum five in this example, the system (e.g., via a separate module) releases the previously assigned keys to the new devices being registered.

In one embodiment, the system may provide extra padding than the minimum calculated by 1+floor(2^floor(log2(N)−1)), e.g., in anticipation that the source of resources from that category will be requesting additional keys in the future. For example, if a manufacturer often requests keys for 100 media players before the winter holiday season, but in a certain year, the manufacturer initially requests only 75 keys, the system (e.g., through analyzing past orders or through user input) may automatically pad as if keys for 100 media players were requested. In such an embodiment, when keys are later requested for 25 additional resources from that category, the system may then release those additional keys to the additional 25 resources.

In other embodiments, the number of dummy resources to be assigned are dynamically determined and dynamically assigned.

Dynamic-Hybrid: In one embodiment, the system identifies a typical maximum number of resources in a category. Using that typical maximum as N, a value for 1+floor(2^floor(log2(N)−1)) is computed to arrive at default number of dummy resources. When resources are to be assigned to the binary tree, this predetermined default number of dummy resources is assigned to a corresponding number of leaf nodes of the binary tree structure. The system determines if this predetermined default number of dummy resources is less than 1+floor(2^floor(log2(N)−1)), using the total number of resources in the current category of resources as the value for N. If the predetermined default number of dummy resources is less, the system assigns an additional number of dummy resources to a corresponding number of leaf nodes of the binary tree before assigning resources from the category to the binary tree.

In this embodiment, as in the Predetermined MARC embodiment described above, more than the absolute minimum number of keys may be assigned to dummy resources than called for to have the optimal SD list contain only SD items that cover resources from one category. However, the number of keys assigned to dummy resources in this embodiment generally will be less than in an embodiment using the Predetermined MARC embodiment described above to assign keys to the same set of resources, which may or may not be significant depending on the application.

In systems implementing the Predetermined MARC or Dynamic-Hybrid embodiments described above, the systems may not store the total number of resources in the previous category assigned to the binary tree.

Dynamic-Minimal: In one embodiment, when resources of one category are assigned to leaf nodes of the binary tree, the system stores the total number of resources in that category. Then, when resources from another category are to be assigned, the system accesses the stored total, compares that stored total and the total number of resources of the current category, and determines which total is greater. The system sets N to be the greater of the stored total and the current total. Using this value for N, the system determines the number of dummy resource to assign by computing 1+floor(2^floor(log2(N)−1)). This embodiment may be better understood with reference to FIG. 12.

Figure 12:
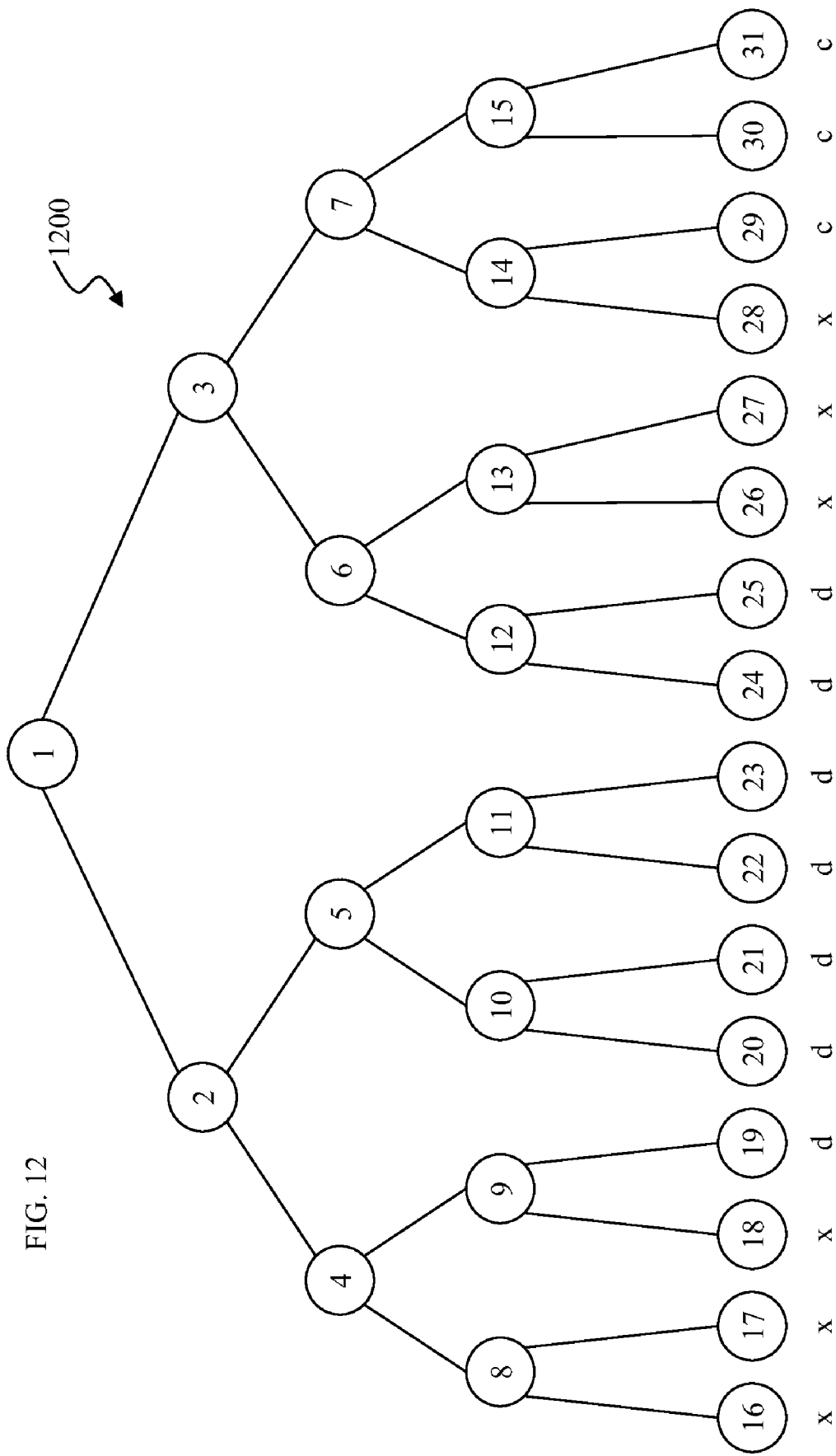

FIG. 12 is an illustration of a binary tree 1200 in accordance with embodiments of this invention. In this example, similar to the examples for FIGS. 10 and 11, manufacturer C makes 3 set-top boxes and manufacturer D makes 7 set-top boxes. However, in this example, manufacturer D's set-top boxes are assigned to the binary tree before manufacturer C's set-top boxes. Manufacturer D may make and request keys for its set-top boxes, for example. Then, weeks or months later, manufacturer C may request keys for its set-top boxes. In a system implementing the Dynamic-Minimal embodiment, the system accesses the stored total (which, at this point in this example, for simplification, is 0 assuming manufacturer D's set-top boxes are the first to be assigned to the binary tree). Comparing this stored value (0) to the total number of resources of the current category (7), the system determines that 7 is greater. Accordingly, the system uses 7 as the value for N and computes 1+floor(2^floor(log2(N)−1)), arriving at 3. Accordingly, 3 dummy resources are assigned to leaf nodes (nodes 16, 17, and 18), then 7 set-top boxes from manufacturer D are assigned to leaf nodes (nodes 19-25). The system then stores (e.g., in memory) that total number of assigned resources (here, 7).

When the set-top boxes from manufacturer C are to be assigned keys (via the binary tree 1200), the system accesses the stored total (7), and compares this stored value (7) to the total number of resources of the current category (3). The system determines that 7 is greater, uses 7 as the value for N, and computes 1+floor(2^floor(log2(N)−1)), arriving at 3. Accordingly, 3 dummy resources are also assigned to leaf nodes (nodes 26, 27, and 28), then 3 set-top boxes from manufacturer C are assigned to leaf nodes (nodes 29-31). The system then stores (e.g., in memory) the latest total number of assigned resources (here, 3).

If the tree is larger, when a next set of resources from another category is to be assigned, the system will access the stored total (this time, 3) and compare that stored total with the total number of resources of the then current category. For example, if a manufacturer E makes 63 set-top boxes that are to be assigned keys, the system in this example compares the stored total (now 3) with 63 and determine that 63 is greater. Accordingly, the system uses 63 as the value for N and computes 1+floor(2^floor(log2(N)−1)), arriving at 17. Accordingly, 17 dummy resources are assigned to leaf nodes, then the 63 set-top boxes from manufacturer E. The system then stores that latest total number of assigned resources, 63.

In the embodiment shown in FIG. 12, the optimal SD list for the binary tree 1200 is "9-18 plus 2-4 plus 6-13 plus 7-28". Each SD item in this list also covers only resources from one category. "9-18" covers only set-top boxes from manufacturer D. "2-4" also covers only set-top boxes from manufacturer D. "6-13" also covers only set-top boxes from manufacturer D. "7-28" covers only set-top boxes from manufacturer C.

In some embodiments, a lookup table listing pre-computed values of 1+floor(2^floor(log2(N)−1) for various values of N is stored, e.g., in memory. In such embodiments, rather than computing 1+floor(2^floor(log2(N)−1)), the system accesses the lookup table to identify the corresponding number of dummy resources for a particular value of N.

In some embodiments, if the stored value is zero, the system does not assign dummy resources to leaf nodes before assigning actual resources, e.g. devices, to leaf nodes. For example, instead of comparing the stored value (0) to the total number of resource of the current category (7), determining that 7 is greater, and then using 7 for the value of N to determine the number of dummy resources in the example above, in one embodiment, the system identifies that the stored value is zero and then skips over the assignment of dummy resources for that instance, or assigns zero dummy resources for that instance. According, in such an embodiment, the 7 set-top boxes from manufacturer D would be assigned to leaf nodes (nodes 16-22).

In one embodiment, the system receives requests to assign keys to resources from multiple categories, e.g., from manufacturer D, C, and E as in the example above, within a certain time period. For example, the system may receive the requests within one work day. Rather than assigning keys to the resources as the requests are received, or in the order the requests are received, the system may wait to the end of the time period before assigning resource to keys and instead analyzes the requests to see a reordering of the requests is applicable. For example, at close of business, the system may analyze the requests and identify (e.g., using the identifier 1532 described below with reference to FIG. 15) that the request from manufacturer D involves assigning keys to 7 set-top boxes, the request from manufacturer C involves assigning keys to 3 set-top boxes, and the request from manufacturer E involves assigning keys to 63 set-top boxes. The system may use an elevator algorithm (or a SCAN type algorithm) to reorder the requests (e.g., using the re-orderer 1538 described below with reference to FIG. 15).

For example, if no resources had been previously assigned to the binary tree, the system may reorder the request from smallest number of resources per category to largest number of resources per category. Accordingly, the request from manufacturer C to assign keys to 3 set-top boxes would be fulfilled first, then the request from manufacturer D to assign keys to 7 set-top boxes would be fulfilled, then the request from manufacturer E to assign keys to 63 set-top boxes would be fulfilled. If instead, 60 or 70 resources had been previously assigned to the binary tree, for example, the system may reorder the request from largest number of resources per category to smallest number of resources per category. Accordingly, the request from manufacturer E to assign keys to 63 set-top boxes would be fulfilled first, then the request from manufacturer D to assign keys to 7 set-top boxes would be fulfilled, then the request from manufacturer C to assign keys to 3 set-top boxes would be fulfilled. In such an embodiment, the total number of dummy resources assigned to the binary tree may be reduced.

In one embodiment, the system assigns the minimum number of dummy resources to leaf nodes as provided for in the embodiments above, but prior to assigning each resource (e.g., each media player) in the current category of resources to a leaf node in the binary tree, the system assigns an additional number of dummy resources to leaf nodes. The additional number of dummy resources may be a seemingly random number. This may be performed, for example, to help obfuscate from unauthorized users the assignment of keys to resources. In exemplary embodiments, the additional number of dummy resources is a random number within a certain predetermined range of numbers. In one embodiment, the certain predetermined range of numbers starts at zero, inclusively. For example, the predetermined range may be 0-8, inclusive.

Figure 14:
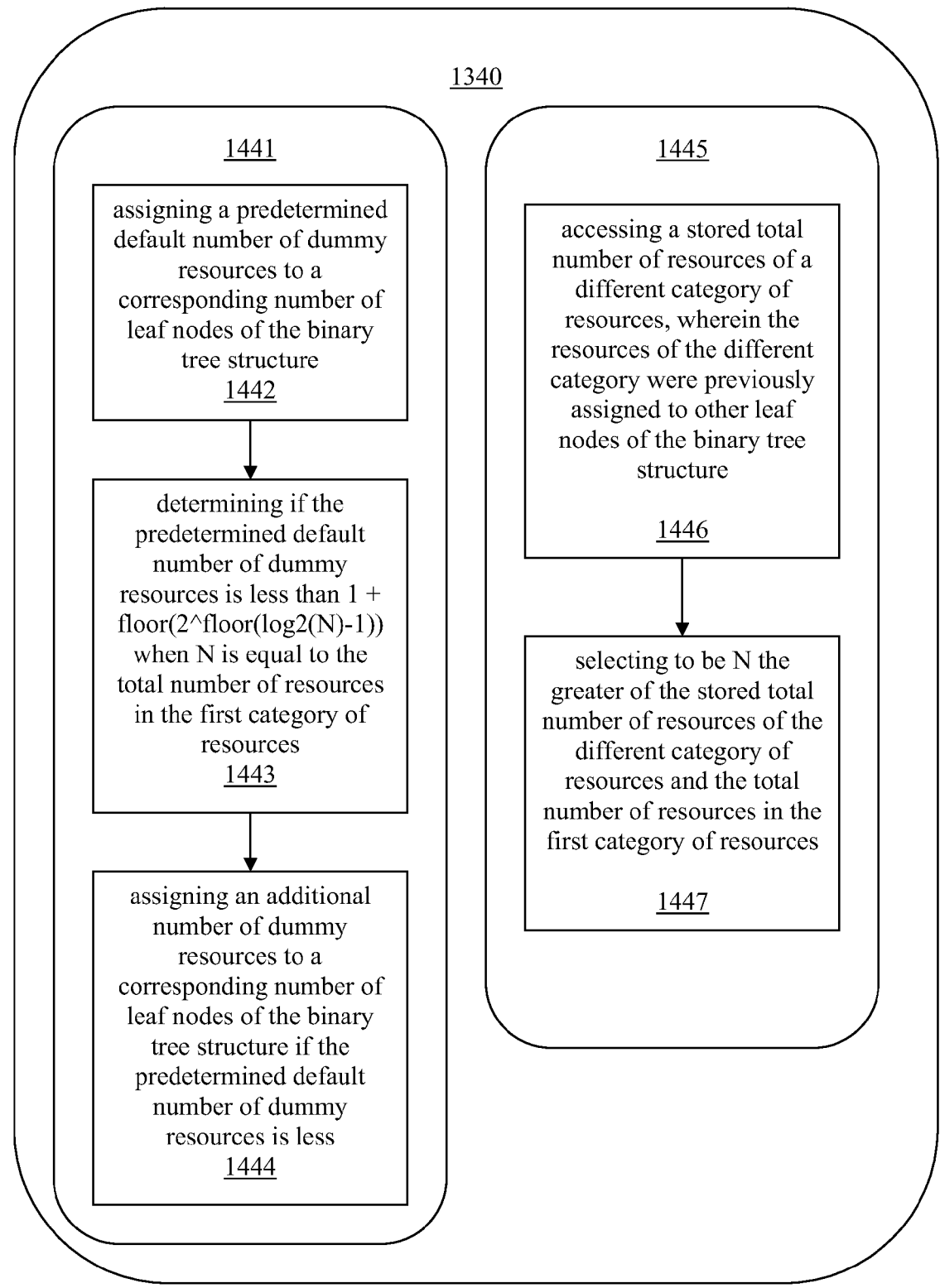
FIG. 14 is a flow chart showing a method in accordance with embodiments of this disclosure.

Embodiments described above may also be understood with reference to FIGS. 13 and 14. FIG. 13 is a flow chart showing a method 1300 in accordance with embodiments of this disclosure. At 1310, a system (e.g., system 1500 or module 1502, described in more detail below with reference to FIG. 15) identifies a total number of resources in a first category of resources (e.g., via the identifier 1532 described below with reference to FIG. 15). At 1320, the system assigns a minimum number of dummy resources to a corresponding number of leaf nodes of a binary tree structure. The minimum number of dummy resources is greater than or equal to 1+floor(2^floor(log2(N)−1)). In FIG. 13, N is greater than or equal to the total number of resources in the first category of resources. At 1350, the system assigns each resource in the first category of resources to a leaf node in the binary tree structure.

In one embodiment, the system performs the assignment of 1320 via a process identified in FIG. 13 by 1330. In such an embodiment, a system (via 1330) implements Predetermined MARC. In particular, at 1332, the system determines a maximum total number of resources in any category of resources having resources to be assigned to leaf nodes of the binary tree structure. At 1334, the system sets the minimum number of dummy resources to be 1+floor(2^floor(log2(N)−1)), wherein N is the maximum total number.

In other embodiments, the system performs the assignment of 1320 via a process identified in FIG. 13 by 1340. At 1340, the system dynamically assigns, based on the total number of resources, a minimum number of dummy resources to a corresponding number of leaf nodes of a binary tree structure. That minimum number of dummy resources is greater than or equal to 1+floor(2^floor(log2(N)−1)), wherein N is greater than or equal to the total number of resources in the first category of resources.

FIG. 14 is a flow chart showing a method 1340 in accordance with embodiments of this disclosure. In one embodiment, the system performs the dynamic assignment of 1340 via a process identified in FIG. 14 by 1441. In such an embodiment, a system (via 1441) implements Dynamic-Hybrid. In particular, at 1442, the system assigns a predetermined default number of dummy resources to a corresponding number of leaf nodes of the binary tree structure. At 1443, the system determines if the predetermined default number of dummy resources is less than 1+floor(2^floor(log2(N)−1)) when N is equal to the total number of resources in the first category of resources. At 1444, the system assigns an additional number of dummy resources to a corresponding number of leaf nodes of the binary tree structure if the predetermined default number of dummy resources is less.

In one embodiment, the system performs the dynamic assignment of 1340 via a process identified in FIG. 14 by 1445. In such an embodiment, a system (via 1445) implements Dynamic-Minimal. In particular, at 1446, the system accesses a stored total number of resources of a different category of resources, wherein the resources of the different category were previously assigned to other leaf nodes of the binary tree structure. At 1447, the system selects to be N the greater of the stored total number of resources of the different category of resources and the total number of resources in the first category of resources.

After the assignment at 1340, the system assigns at 1350 (seen in FIG. 13) each resource in the first category of resources to a leaf node in the binary tree structure.

In one embodiment, the system also deactivates the keys corresponding to leaf nodes assigned to the dummy resources. Such deactivation may discourage unauthorized users from trying to discover such keys in order to try to decrypt broadcast encrypted content in an unauthorized fashion, for example.

Figure 15:
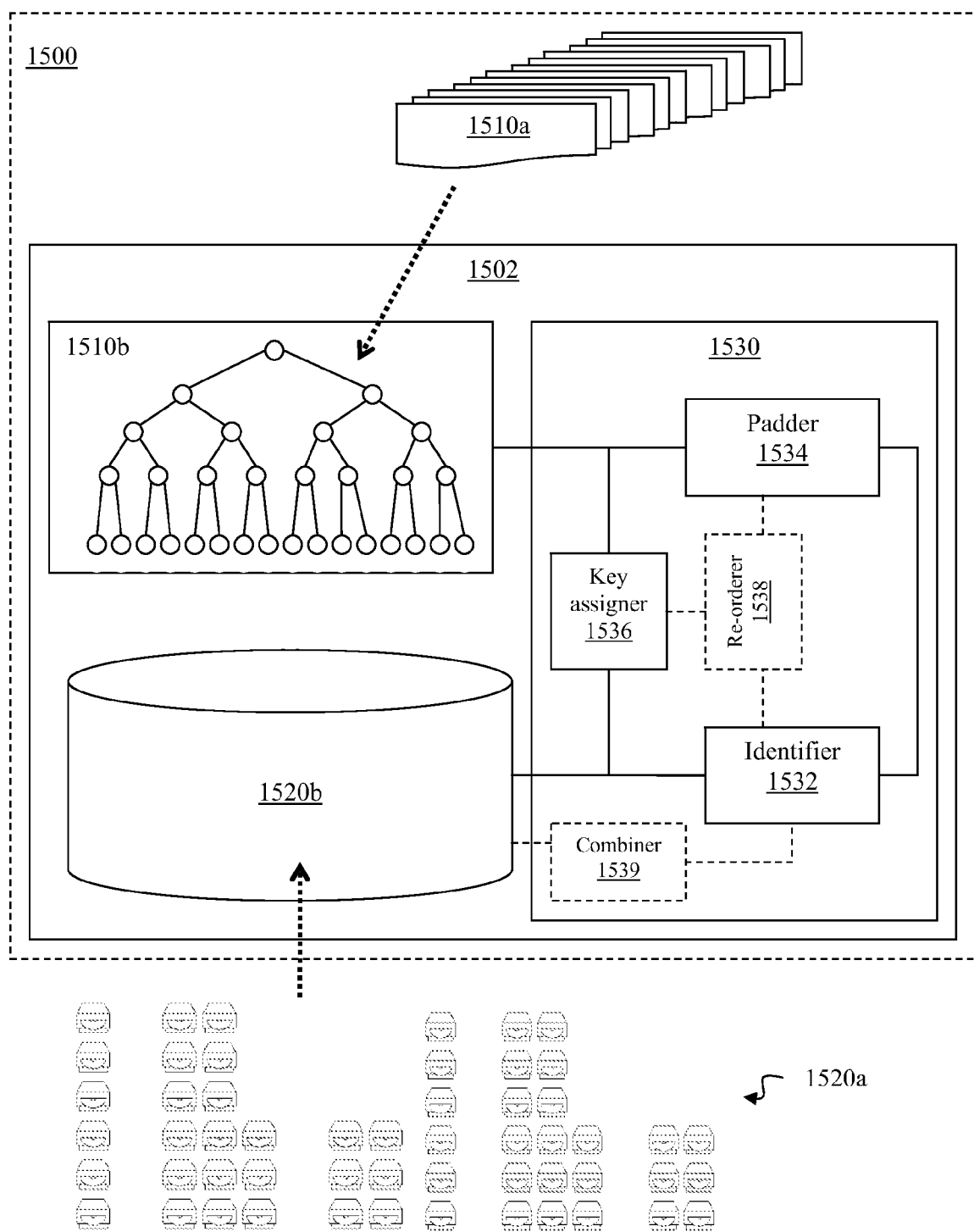
FIG. 15 is a diagram of a system for assigning resources to keys in accordance with embodiments of this invention.

FIG. 15 is a diagram of a system 1500 for assigning resources to keys in accordance with embodiments of this invention. The system 1500 includes keys 1510*a* and a module 1502. The module 1502 includes a binary tree structure 1510*b*, a storage 1520*b*, and an assignment mechanism 1530. The assignment mechanism includes an identifier 1532, a padder 1534, and a key assigner 1536. In certain embodiments, the system 1500 may also include a re-orderer 1538 and/or a combiner 1539, which are shown in FIG. 15 with dashed lines as optional parts of the assignment mechanism 1530. In FIG. 15, resources 1520*a* are also shown.

In FIG. 15, the keys 1510*a*, which are typically pre-defined, are represented by the binary tree structure 1510*b*. Also, in the embodiment shown, the resources 1520*a* are external to the system 1500 in the sense that they are not physically connected to the system. In other embodiments, the resources 1520*a* may be connected to the system 1500, e.g. in order to be assigned a key. The resources 1520*a* are divided into a plurality of categories based on one or more similar properties. Information relating to the resources 1520*a* is stored in the storage 1520*b*. In an exemplary embodiment, this information, may include how the resources are divided into categories, the property or properties which form the basis of how the resources are divided into categories, etc. For example, the information may include each resource's manufacturer, brand, originating location, and/or destination location. Accordingly, the storage 1520*b* stores information relating to resources divided into a plurality of categories based on one or more similar properties.

The assignment mechanism 1530 is coupled to the binary tree structure 1510*b* and the storage 1520*b*. The assignment mechanism 1530 includes an identifier 1532 coupled to the storage 1520*b*, a padder 1534 coupled to the binary tree structure 1510*b* and the identifier 1532, and a key assigner 1536 coupled to the binary tree structure 1510*b* and the storage 1520*b*. In FIG. 15, the optional re-orderer 1538 is coupled to the identifier 1532, the padder 1534, and the key assigner 1536. In FIG. 15, the optional combiner 1539 is coupled to the storage 1520*b* and the identifier 1532.

In use, the identifier 1532 identifies a total number of resources in a first category of resources. In an exemplary embodiment, the resources are players of encryption protected content. The resources may be, for example, CD players, DVD players, HD DVD players, BD players, Secure Digital card readers, and/or set-top boxes. For example, the identifier 1532 may identify that there are 5000 set-top boxes from a warehouse in California to be assigned keys. In one embodiment, the resources store access protected content and the resources are rooms, floors of a building, and/or documents. In one embodiment, the identifier 1532 identifies the total number of resources by requesting the information stored in the storage 1520*b*.

The padder 1534 receives from the identifier 1532 the total number of resources in the first category of resources (e.g., 5000). Padder 1534 assigns a minimum number of dummy resources to a corresponding number of leaf nodes of the binary tree structure 1510*b*. In one embodiment, for the particular instance in which no resources have been assigned to the binary tree previously, the padder 1534 assigns zero as the minimum number of dummy resources. In most instances, the minimum number of dummy resources is greater than or equal to $1+\text{floor}(2^{\text{floor}(\log_2(N)-1)})$, wherein N is greater than or equal to the total number of resources in the first category of resources. In this example, N is greater or equal to 5000. Accordingly, the minimum number of dummy resources in this instance will be greater or equal to $1+\text{floor}(2^{\text{floor}(\log_2(5000)-1)})$, or 2049.

The key assigner 1536 assigns each resource in the first category of resources (in this example, each of the 5000 set-top boxes from the California warehouse) to a leaf node in the binary tree structure 1510*b*.

In several embodiments, the total number of resources in the first category of resources will differ from the total number of resources in a second category of resources. For example, the total number of resources in the first category of resources is 5000 in the example above. The total number of resources in a second category of resources, e.g. set-top boxes from an Oregon warehouse, may be 1000. The total number of resources in a third category of resources, e.g. set-top boxes from a Minnesota warehouse, may be 8000, for example.

In one embodiment, the system includes the combiner 1539. In such an embodiment, the system may identify that requests from different sources to assign resources to keys may be combined into one request. For example, in a work day, the system 1502 may receive three requests to assign resources to keys represented by the binary tree. The requests may come from the warehouse in California, the warehouse in Oregon, and the warehouse in Minnesota. Using information stored in the storage 1520*b*, however, the system may recognize that the warehouse in California and the warehouse in Oregon belong to the same manufacturer. The system may be configured to consider "manufacturer" as a primary category divider, and "warehouse" as a secondary category divider. Accordingly, in such an embodiment, the system 1502 uses the combiner 1539 to combine the request from the warehouse in California and the warehouse in Oregon such that no dummy resources are assigned to leaf nodes between assigning resources from those warehouses to leaf nodes. Accordingly, systems in accordance with embodiments of this disclosure may vary the granularity with which it processes categories of resources using a module, e.g., the combiner 1539.

In one embodiment, the system includes the re-orderer 1538 and the combiner 1539. Accordingly, in one example use, after the combiner 1539 combines the set-top boxes from the warehouse in California and the warehouse in Oregon into one mega category, the system may use identifier 1532 to identify that the mega category has 6000 set-top boxes and that the category of set-top boxes from the Minnesota warehouse has 8000 set-top boxes. The system may then use an elevator algorithm (or SCAN type algorithm) to determine whether set-top boxes from the mega category or from the Minnesota warehouse should be assigned to leaf nodes of the binary tree 1510*b* first.

Exemplary Applications

As disclosed above, embodiments of this invention may be used in content protection systems. In some of the examples above, the content protected by the content protection system are copyright protected works of authorship stored in CDs, DVDs, HD DVDs, BDs, Secure Digital cards, and/or other memory. For example, the content may be stored in the main memory of a set-top box as the encrypted content is being streamed through the internet or another telecommunications channel to the set-top box. As another example, the content may be stored in the flash drive of an electronic book reader. The devices that play the content are assigned a key used in decrypting the encrypted content. Assigning keys to such devices in accordance with embodiments of this invention may help in efficiently invalidating or deactivating keys and may help in the tracing to a particular device the unauthorized decryption of certain content.

In one application, certain fields of a document are protected. For example, certain information contained in a legal document is redacted by protecting with an encryption the fields of the document containing sensitive information, e.g., the dollar amount of an agreement. Keys may be assigned allowing only certain devices to read that dollar amount. Others may review remainder of the document, e.g., other terms of the agreement. If the document is later found on the web, for example, with that dollar amount appearing decrypted, deducing which device decrypted that field may be more efficiently performed if the keys to perform that decryption are assigned to the devices in accordance with embodiments of this invention.

Conclusion

Accordingly, embodiments of the disclosure relate to binary tree structures, and more specifically to assigning resources to a binary tree structure. It shall be appreciated that many modifications to and variations upon particular exemplary embodiments discussed above may be made without departing from the scope and spirit of this disclosure. These embodiments were chosen and described in order to best explain the principles of this disclosure and the practical application, and to enable others of ordinary skill in the art to understand this disclosure for various embodiments with various modifications as are suited to the particular use contemplated.

In some exemplary embodiments, keys, as used the term is used herein, are software keys (e.g., a media key). However, in other embodiments, keys may be physical keys. In some exemplary embodiments, resources are specialized physical devices. In other embodiments, resources are specialized software devices, e.g., software devices programmed to play music. In other embodiments, the resources are general-purpose devices, e.g., general purpose computers or floors of a building, which include specialized components or specialized modules that allow for the playing of protected content using the keys described herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 16:
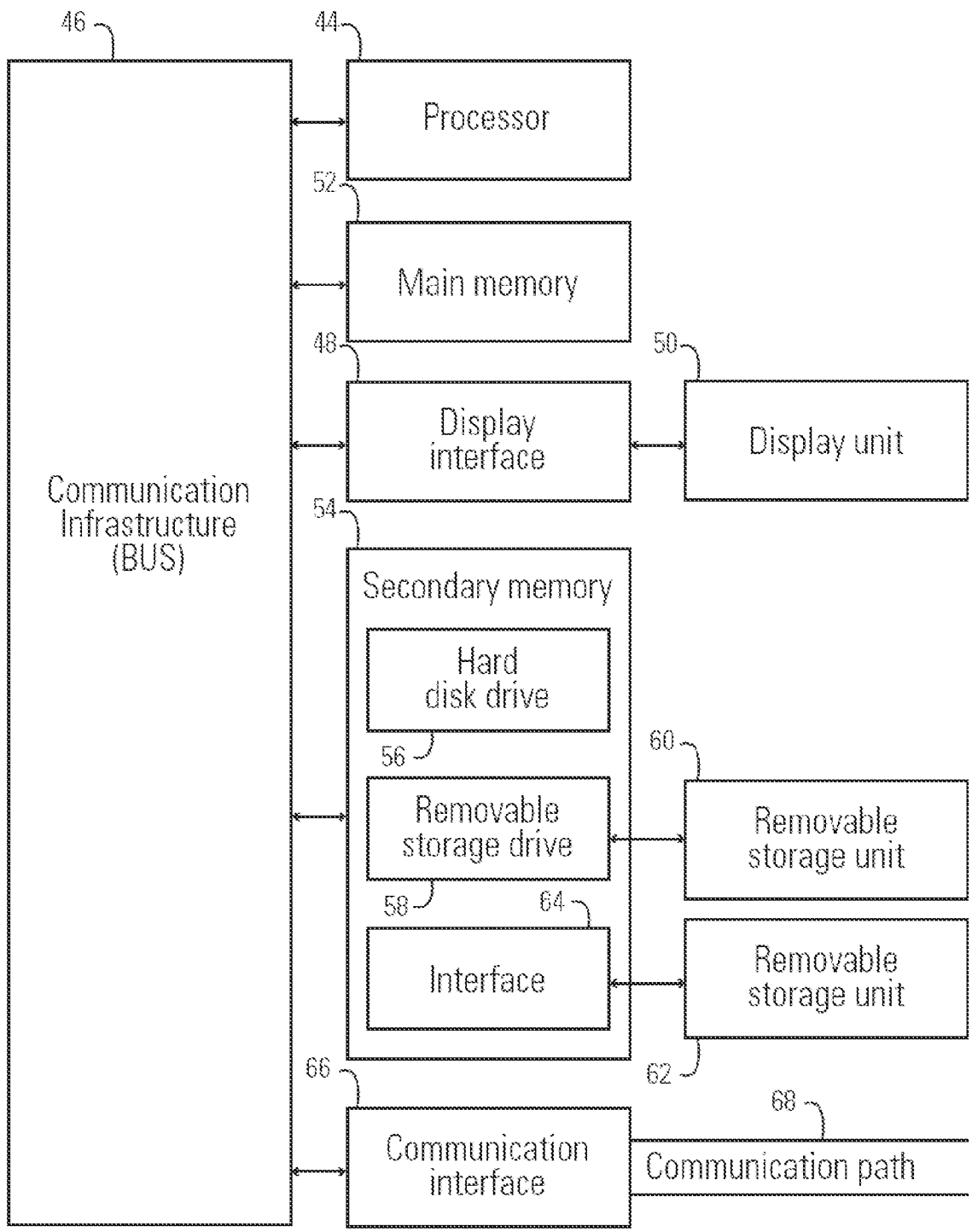
FIG. 16 is a high level block diagram showing an information processing system useful for implementing embodiments of this invention.

FIG. 16 is a high level block diagram showing an information processing system useful for implementing embodiments of this invention. The processing system may be or be part of a module 1502, for example. The computer system includes one or more processors, such as processor 44. The processor 44 is connected to a communication infrastructure 46 (e.g., a communications bus, cross-over bar, or network). Various embodiments are described in terms of this exemplary computer system. After reading this description, it will become apparent to a person of ordinary skill in the relevant art(s) how to implement embodiments of this disclosure using other computer systems and/or computer architectures.

The computer system can include a display interface 48 that forwards graphics, text, and other data from the communication infrastructure 46 (or from a frame buffer not shown) for display on a display unit 50. The computer system also includes a main memory 52, preferably random access memory (RAM), and may also include a secondary memory 54. The secondary memory 54 may include, for example, a hard disk drive 56 and/or a removable storage drive 58, representing, for example, a floppy disk drive, a magnetic tape drive, or an optical disk drive. The removable storage drive 58 reads from and/or writes to a removable storage unit 60 in a manner well known to those having ordinary skill in the art. Removable storage unit 60 represents, for example, a floppy disk, a compact disc, a magnetic tape, or an optical disk, etc. which is read by and written to by removable storage drive 58. As will be appreciated, the removable storage unit 60 includes a computer readable medium having stored therein computer software and/or data.

In alternative embodiments, the secondary memory 54 may include other similar means for allowing computer programs or other instructions to be loaded into the computer system. Such means may include, for example, a removable storage unit 62 and an interface 64. Examples of such means may include a program cartridge and cartridge interface (such as that found in video game devices), a removable memory chip (such as an EPROM, or PROM) and associated socket, and other removable storage units 62 and interfaces 64 which allow software and data to be transferred from the removable storage unit 62 to the computer system.

The computer system may also include a communications interface 66. Communications interface 66 allows software and data to be transferred between the computer system and external devices. Examples of communications interface 66 may include a modem, a network interface (such as an Ethernet card), a communications port, or a PCMCIA slot and card, etc. Software and data transferred via communications interface 66 are in the form of signals which may be, for example, electronic, electromagnetic, optical, or other signals capable of being received by communications interface 66. These signals are provided to communications interface 66 via a communications path (i.e., channel) 68. This channel 68 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 52 and secondary memory 54, removable storage drive 58, and a hard disk installed in hard disk drive 56.

Computer programs (also called computer control logic) are stored in main memory 52 and/or secondary memory 54. Computer programs may also be received via communications interface 66. Such computer programs, when executed, enable the computer system to perform the features of the present disclosure as discussed herein. In particular, the computer programs, when executed, enable the processor 44 to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, references to "a method" or "an embodiment" or "one embodiment" or "a system" throughout are not intended to mean the same method or same embodiment or same system, unless the context indicates otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for assigning resources to leaf nodes of a binary tree structure such that, for a subset difference list for the binary tree structure, each subset difference item of the subset difference list covers resources from only one category of resources, the method comprising:
    identifying, by a processor, a total number of resources in a first category of resources;
    assigning a minimum number of dummy resources to a corresponding number of leaf nodes of the binary tree structure, wherein the minimum number of dummy resources is greater than or equal to 1+floor(2^floor(log2(N)−1)), wherein N is greater than or equal to said total number of resources in the first category of resources; and
    assigning each resource in said first category of resources to a leaf node in the binary tree structure.

2. The method of claim 1, assigning a minimum number of dummy resources to a corresponding number of leaf nodes of a binary tree structure, wherein the minimum number of dummy resources is greater than or equal to 1+floor(2^floor(log2(N)−1)), wherein N is greater than or equal to said total number of resources in the first category of resources, comprises:
    dynamically assigning, based on said total number of resources, a minimum number of dummy resources to a corresponding number of leaf nodes of a binary tree structure, wherein the minimum number of dummy resources is greater than or equal to 1+floor(2^floor(log2(N)−1)), wherein N is greater than or equal to said total number of resources in the first category of resources.

3. The method of claim 2, wherein dynamically assigning, based on said total number of resources, a minimum number of dummy resources to a corresponding number of leaf nodes of a binary tree structure, comprises:
    accessing a stored total number of resources of a different category of resources, wherein the resources of the different category were previously assigned to other leaf nodes of said binary tree structure; and
    selecting to be N the greater of the stored total number of resources of the different category of resources and the total number of resources in the first category of resources.

4. The method of claim 2, wherein dynamically assigning, based on said total number of resources, a minimum number of dummy resources to a corresponding number of leaf nodes of a binary tree structure, comprises:
    assigning a predetermined default number of dummy resources to a corresponding number of leaf nodes of the binary tree structure;
    determining if the predetermined default number of dummy resources is less than 1+floor(2^floor(log2(N)−1)) when N is equal to the total number of resources in the first category of resources; and
    assigning an additional number of dummy resources to a corresponding number of leaf nodes of the binary tree structure if the predetermined default number of dummy resources is less.

5. The method of claim 1, wherein assigning a minimum number of dummy resources to a corresponding number of leaf nodes of a binary tree structure, wherein the minimum number of dummy resources is greater than or equal to 1+floor(2^floor(log2(N)−1)), wherein N is greater than or equal to said total number of resources in the first category of resources, comprises:
    determining a maximum total number of resources in any category of resources having resources to be assigned to leaf nodes of said binary tree structure; and
    setting the minimum number of dummy resources to be 1+floor(2^floor(log2(N) −1)), wherein N is said maximum total number.

6. The method of claim 1, wherein assigning a minimum number of dummy resources to a corresponding number of leaf nodes of a binary tree structure, wherein the minimum number of dummy resources is greater than or equal to 1+floor(2^floor(log2(N)−1)), wherein N is greater than or equal to said total number of resources in the first category of resources, comprises:
    based on said total number of resources, accessing a lookup table stored in a memory, wherein the lookup table comprises pre-computed values of 1+floor(2^floor(log2(N)−1)) for various values of N.

7. The method of claim 1, wherein identifying a total number of resources in a first category of resources comprises:
    identifying a total number of devices in a first category of devices, wherein the devices are players of encryption protected content stored on a tangible medium.

8. The method of claim 7, wherein identifying a total number of devices in a first category of devices, wherein the devices are players of encryption protected content stored on a tangible medium, comprises:
    identifying a first category of devices, wherein devices in the first category of devices have one or more similar properties, and wherein the one or more properties is selected from the group consisting of manufacturer, brand, originating location, and destination location.

9. The method of claim 7, wherein identifying a total number of devices in a first category of devices, wherein the devices are players of encryption protected content stored on a tangible medium, comprises:
    identifying a total number of devices in a first category of devices, wherein the devices are players of encryption protected content stored on a tangible medium selected from the group consisting of a CD, a DVD, an HD DVD, a BD, and a Secure Digital card.

10. The method of claim 1, wherein identifying a total number of resources in a first category of resources comprises:
    identifying a total number of resources in a first category of resources, wherein the resources store access controlled content and are selected from the group consisting of rooms, floors of a building, and documents.

11. A system for assigning resources to keys, the system comprising:
    a memory for storing information relating to resources divided into a plurality of categories based on one or more similar properties and for storing a binary tree structure having leaf nodes representing keys; and
    a processor coupled to the memory, the processor configured to execute an assignment mechanism, the assignment mechanism comprising:

an identifier configured to identify a total number of resources in a first category of resources;

a padder configured to receive from the identifier the total number of resources in the first category of resources and to assign a minimum number of dummy resources to a corresponding number of leaf nodes of the binary tree structure, wherein the minimum number of dummy resources is greater than or equal to 1+floor(2floor(log2(N)−1)), wherein N is greater than or equal to said total number of resources in the first category of resources; and a key assigner configured to assign each resource in said first category of resources to a leaf node in the binary tree structure.

12. The system of claim 11, wherein the resources are players of encryption protected content.

13. The system of claim 12, wherein the players are selected from the group consisting of CD players, DVD players, HD DVD players, BD players, Secure Digital card readers, and set-top boxes.

14. The system of claim 11, wherein the resources store access-protected content and the resources are selected from the group consisting of rooms, floors of a building, and documents.

15. The system of claim 11, wherein the one or more properties is selected from the group consisting of manufacturer, brand, originating location, and destination location.

16. The system of claim 11, wherein the total number of resources in a first category of resources differs from a total number of resources in a second category of resources.

17. A method for assigning media players to content decryption keys, the method comprising:

identifying, by a processor, a binary tree having leaf nodes representing content decryption keys;

identifying a total number of media players in a current category of media players;

accessing a stored total number of media players of a previous category of media players, wherein the media players of the previous category were previously assigned to leaf nodes of said binary tree;

selecting a number N to be the greater of the total number of media players in the current category of media players and the stored total number of media players of the previous category of media players;

using said selected number N, determining a value of 1+floor(2^floor(log2(N)−1));

assigning a minimum number of dummy resources to a corresponding number of leaf nodes of said binary tree, wherein said minimum number is said determined value; and assigning each media player in said current category of resources to a leaf node in the binary tree.

18. The method of claim 17, further comprising:
storing the total number of media players in the current category of media players; and
for a next category of media players to be assigned content decryption keys, using said stored total number of media players in the current category as the stored total number of resources of a previous category of media players.

19. The method of claim 17, further comprising:
deactivating the keys corresponding to leaf nodes assigned to the dummy resources.

20. The method of claim 17, further comprising:
identifying, with a certain time period, a total number of media players in a second category of media players, wherein the certain time period ends before the assigning of each media player in the current category to a leaf node in the binary tree;
using an elevator algorithm, and based on the stored total number of media players in the previous category of media players, determining which, between the media players in the current category and the media players in the second category, to assign first to leaf nodes of the binary tree.

21. The method of claim 17, further comprising:
identifying, with a certain time period, a total number of media players in a second category of media players, wherein the certain time period expires before the assigning of each media player in the current category to a leaf node in the binary tree; and
combining the current category of media players with the second category of media players when the categories have a certain similar property.

22. The method of claim 17, further comprising:
when the media players of the current category of media players are the first media players to be assigned to leaf nodes of the binary tree, setting the minimum number of dummy resources to zero.

23. The method of claim 17, further comprising:
subsequent to assigning the minimum number of dummy resources and prior to assigning each media player in the current category of resources to a leaf node in the binary tree, assigning an additional number of dummy resources to leaf nodes.

24. The method of claim 23, wherein the additional number of dummy resources is a random number within a certain predetermined range of numbers.

25. The method of claim 23, wherein the certain predetermined range of numbers starts at zero, inclusively.

* * * * *